(12) United States Patent
Nakamura et al.

(10) Patent No.: US 8,529,980 B2
(45) Date of Patent: *Sep. 10, 2013

(54) CEREAL FLOUR COMPOSITION CONTAINING WHEAT FLOUR FROM SWEET WHEAT AND FOOD PRODUCT USING THE SAME

(75) Inventors: Toshiki Nakamura, Morioka (JP); Junichi Yonemaru, Morioka (JP); Goro Ishikawa, Morioka (JP); Tomoya Shinbata, Atsugi (JP); Mika Saito, Atsugi (JP); Hideyo Yasuda, Atsugi (JP); Yasuhiro Seto, Atsugi (JP); Yoichi Kurimoto, Atsugi (JP); Yoshikazu Ishihara, Atsugi (JP)

(73) Assignees: National Agriculture and Food Research Organization, Ibaraki (JP); Nippon Flour Mills Co., Ltd., Tokyo (JP)

( * ) Notice: Subject to any disclaimer, the term of this patent is extended or adjusted under 35 U.S.C. 154(b) by 714 days.

This patent is subject to a terminal disclaimer.

(21) Appl. No.: 12/513,058

(22) PCT Filed: Nov. 1, 2007

(86) PCT No.: PCT/JP2007/071322

§ 371 (c)(1),
(2), (4) Date: Apr. 30, 2009

(87) PCT Pub. No.: WO2008/053964

PCT Pub. Date: May 8, 2008

(65) Prior Publication Data

US 2010/0055283 A1 Mar. 4, 2010

(30) Foreign Application Priority Data

Nov. 1, 2006 (JP) ................................. 2006-298064

(51) Int. Cl.
*A21D 6/00* (2006.01)

(52) U.S. Cl.
USPC .......................................... 426/622; 426/549

(58) Field of Classification Search
USPC ................................................ 426/622, 549
See application file for complete search history.

(56) References Cited

U.S. PATENT DOCUMENTS

| 6,042,867 A | 3/2000 | Hoshino et al. |
| 6,139,894 A | 10/2000 | Hoshino et al. |
| 6,361,935 B1 * | 3/2002 | Keeling et al. ................... 435/4 |
| 7,001,939 B2 * | 2/2006 | Yamamori ....................... 524/47 |

FOREIGN PATENT DOCUMENTS

| CA | 2 607 344 | 11/2006 |
| JP | 06-125669 A | 5/1994 |
| JP | 09-191818 A | 7/1997 |
| JP | 09-191819 A | 7/1997 |
| JP | 09-191842 A | 7/1997 |
| JP | 10-066511 A | 3/1998 |
| JP | 10-066527 A | 3/1998 |
| JP | 10-066529 A | 3/1998 |
| JP | 10-066530 A | 3/1998 |
| JP | 2005-333832 A | 12/2005 |
| WO | 2006/118300 | 11/2006 |

OTHER PUBLICATIONS

M. Yamamori, et al., "Genetic elimination of a starch granule protein, SGP-1, of wheat generates an altered starch with apparent high amylose", Theor. Appl. Genet., 2000, pp. 21-29, vol. 101, Nos. 1-2.
T. Shimbata, et al., "Mutations in wheat starch synthase II genes and PCR-based selection of a SGP-1 null line", Theor. Appl. Genet., 2005, pp. 1072-1079, vol. 111, No. 6.
T. Nakamura, et al., "Sweet wheat that has been developed by using mutation of starch synthases", Brain Techno News, Jul. 2007, pp. 13-18, No. 122.
T. Nakamura, et al., "Rapid classification of partial waxy wheats using PCR-based markers", Genome, 2002, pp. 1150-1156, vol. 45.
T. Nakamura, et al., "Sweet Wheat", Genes. Genet. Syst., 2006, pp. 361-365, vol. 81.
T. Nakamura, et al., "Production of waxy (amylose-free) wheats", Mol. Gen. Genet., 1995, pp. 253-259, vol. 248.

* cited by examiner

*Primary Examiner* — Lien T Tran
(74) *Attorney, Agent, or Firm* — Sughrue Mion, PLLC

(57) ABSTRACT

An object of the present invention is to provide a cereal flour raw material that can provide products having superb texture. A further object of the present invention is to provide a food product manufactured using such a cereal flour raw material. The present invention provides a cereal flour composition that contains wheat flour prepared from a type of wheat that does not express the three wheat starch synthase II proteins, and also does not express the three wheat granule bound starch synthase proteins, and another type of cereal flour; and a food product manufactured using such a cereal flour composition.

9 Claims, 2 Drawing Sheets

CEREAL FLOUR COMPOSITION CONTAINING WHEAT FLOUR FROM SWEET WHEAT AND FOOD PRODUCT USING THE SAME

TECHNICAL FIELD

The present invention relates to a cereal flour composition containing wheat flour prepared from a novel wheat, and to a food product manufactured using such a cereal flour composition.

BACKGROUND ART

Wheat flour prepared from wheat is used in a wide range of applications, and a variety of processed foods are provided thereby. The characteristics of wheat flour are determined by many factors, but they are most strongly affected by the properties of the gluten and starch stored in the grains. In particular, starch generally accounts for 60 to 70% of the content of wheat flour, and its pasting properties have a large effect on the processing characteristics, appearance, and texture of the processed food. Starch originating in cereal grains can also come from rice and corn. In such plants searches for mutant genes involved in starch synthesis have been conducted, and mutants that store starch with properties different from the wild type have been discovered. However, because the chromosomes in wheat are hexaploid, mutations in the genes do not easily appear as a phenotype, and therefore very few such mutants are known in wheat.

Starch consists of two types of components: amylose wherein glucose is connected in a straight chain by an $\alpha$-1,4 linkage, and amylopectin wherein glucose is connected in a branching structure by an $\alpha$-1,6 linkage. Starch in wheat is a mixture of the two components of amylose wherein glucose is connected in a straight chain by an $\alpha$-1,4 linkage, and amylopectin wherein glucose is connected in a branching structure by an $\alpha$-1,6 linkage. These components are synthesized by the actions of various enzymes, and are stored in plants in the form of granules in the endosperm of the grains. With the addition of water and heat the starch granules gradually swell, and at a certain predetermined temperature (peak gelatinization temperature) the crystal structure breaks down, and the starch forms an amorphous paste (pasting). Subsequently, the gelatinized starch gradually increases in viscosity as it cools, and finally it gels (retrogradation).

It is known that such pasting properties and the amylose to amylopectin ratio vary greatly depending on the type of plant from which the starch is obtained. The common type of starch found in wheat has an amylose content of about 30%, and low-amylose wheat lines with a content of about 20% are also known. Low-amylose wheat starch is considered to be superior to conventional wheat starch as flour for making udon and other types of noodles, and it has been widely cultivated on a commercial scale. Types of rice and corn that store glutinous mochi (waxy) starch, which has an extremely low amylose content, were already known, and glutinous mochi (waxy) wheat was first bred by Nakamura et al. (see Patent document 1). Known enzymes in wheat that synthesize amylose are granule bound starch synthase-AI, granule bound starch synthase-BI, and granule bound starch synthase-DI, and Nakamura et al. produced waxy wheat by selecting a wheat lines in which none of these enzymes were expressed. This waxy wheat has unique processing characteristics and texture in comparison with conventional wheat types, and it is also considered to have improved aging resistance and the like (see Patent documents 2 to 8). However, there have been few examples of practical application thereof because of problems with the processing characteristics or other texture problems.

On the other hand, wheat lacking starch synthase II-A1, starch synthase II-B1, and starch synthase II-D1, which are enzymes involved in the synthesis of amylopectin, has been reported (see Non-patent documents 1 and 2). It is stated that the amylose content in this type of wheat is markedly higher than in the wild type, but this wheat also has not reached practical application because it is not suited for processing into bread and other products.

[Patent document 1] Japanese Patent Application Laid-open No. H6-125669
[Patent document 2] Japanese Patent Application Laid-open No. H9-191818
[Patent document 3] Japanese Patent Application Laid-open No. H9-191819
[Patent document 4] Japanese Patent Application Laid-open No. H9-191842
[Patent document 5] Japanese Patent Application Laid-open No. H10-66511
[Patent document 6] Japanese Patent Application Laid-open No. H10-66527
[Patent document 7] Japanese Patent Application Laid-open No. H10-66529
[Patent document 8] Japanese Patent Application Laid-open No. H10-66530
[Non-patent document 1] Yamamori et al., Theor. Appl. Genet., 101:21-29 (2000)
[Non-patent document 2] Shimbata et al., Theor App. Genet., 111(6):1072-9 (2005)

DISCLOSURE OF THE INVENTION

An object of the present invention is to provide a cereal flour raw material that can provide a food product with superb texture. A further object of the present invention is to provide a food product manufactured using such a cereal flour raw material.

The inventors conducted extensive and intensive research to solve the above problems, and consequently they discovered that a strong sweetness, a unique flavor, an excellent melt-in-the-mouth sensation, and a soft texture are imparted to food products by using flour from a type of wheat that does not express the three wheat starch synthase II proteins, and also does not express the three wheat granule bound starch synthase proteins, and another type of cereal flour together, thus completing the present invention.

Therefore, the present invention is a cereal flour composition characterized in that it contains wheat flour prepared from a type of wheat that does not express the three wheat starch synthase II proteins, and also does not express the three wheat granule bound starch synthase proteins, and also another type of cereal flour. In this case, the term wheat flour refers to a powder obtained by processing wheat, and it refers to a flour obtained by pulverizing whole wheat grains to produce a powder, or a flour classified by a difference in particle size obtained by passing that powder through a sieve, or a flour obtained by processing wheat into powder through a conventional flour milling process, and then mixing flour powders at a desired ratio, etc.

In the aforementioned cereal flour composition of the present invention, the content of wheat flour prepared from a type of wheat specified above is generally 0.5 to 30 wt %, preferably 1 to 20 wt %, more preferably 2 to 20 wt %, and most preferably 5 to 10 wt %.

Therefore, modes for carrying out the present invention include the aforementioned cereal flour composition containing 0.5 to 30 wt % of the wheat flour prepared from a type of wheat that does not express the three wheat starch synthase II proteins, and also does not express the three wheat granule bound starch synthase proteins; and the aforementioned cereal flour composition containing 1 to 20 wt % of the wheat flour prepared from a type of wheat that does not express the three wheat starch synthase II proteins, and also does not express the three wheat granule bound starch synthase proteins. Furthermore, modes for carrying out the present invention include the aforementioned cereal flour composition containing 2 to 20 wt % of the wheat flour prepared from a type of wheat that does not express the three wheat starch synthase II proteins, and also does not express the three wheat granule bound starch synthase proteins; and the aforementioned cereal flour composition containing 5 to 10 wt % of the wheat flour prepared from a type of wheat that does not express the three wheat starch synthase II proteins, and also does not express the three wheat granule bound starch synthase proteins.

A different mode for carrying out the present invention is one wherein the aforementioned other type of cereal flour can be selected from the group consisting of wheat flour from non-waxy wheat, waxy wheat, rice flour, starch, buckwheat flour, barley flour, corn flour, and oat flour. Among these, the use of wheat flour from non-waxy wheat is preferred.

The cereal flour composition of the present invention can be used in the manufacture of a variety of food products.

Therefore, the present invention is also a process for producing a food product that includes the use of the aforementioned cereal flour composition. The present invention is intended for the process of producing a food product that includes admixing a wheat flour prepared from a type of wheat that does not express the three wheat starch synthase II proteins, and also does not express the three wheat granule bound starch synthase proteins together with another type of cereal flour. For the mix ratio of (A) a wheat flour prepared from a type of wheat that does not express the three wheat starch synthase II proteins, and also does not express the three wheat granule bound starch synthase proteins, and (B) another type of cereal flour, a suitable ratio by weight for A:B is a range of 0.5:99.5 to 30:70, preferably 1:99 to 20:80, more preferably 2:98 to 20:80, and most preferably 5:95 to 10:90.

The present invention is also intended for a food product manufactured using the aforementioned cereal flour composition. Examples of the above food product include bakery goods, noodles, deep fried foods, foods cooked on a griddle, roux and sauces, and products comprising a paste of meat or fish.

By combining the wheat flour that is prepared from a type of wheat that does not express the three wheat starch synthase II proteins, and also does not express the three wheat granule bound starch synthase proteins together with another type of cereal flour in accordance with the present invention, it is possible to impart a unique flavor and sweetness, and further texture such as softness and excellent melt-in-the-mouth sensation, to food products.

The aforementioned superb texture is retained after the food product is manufactured, and even after it is stored at room temperature, or in a refrigerator or freezer.

BEST MODE FOR CARRYING OUT THE INVENTION

Figure 1:
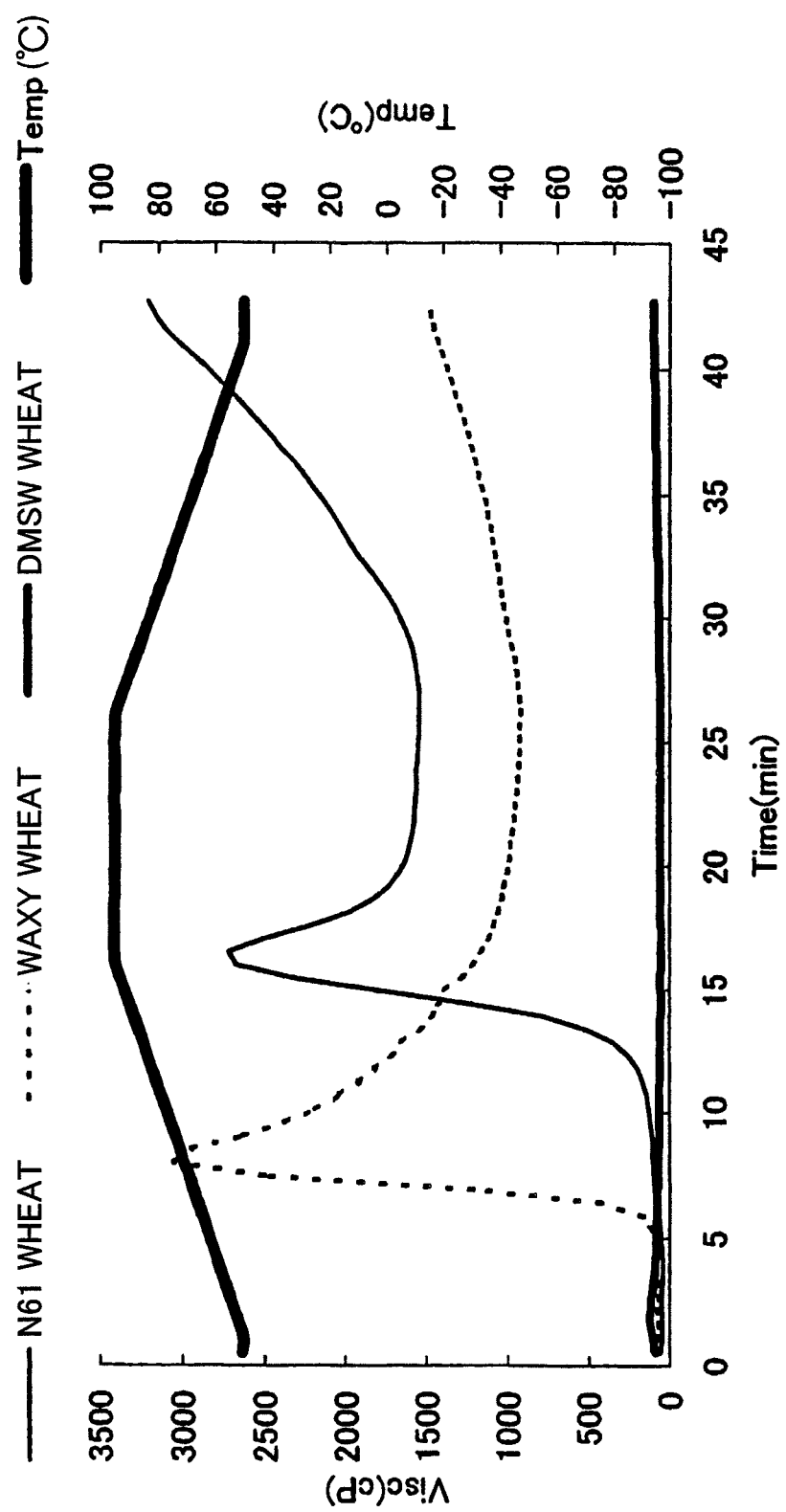
FIG. 1 shows the pasting properties of wheat flour prepared from wheat lacking expression of the wheat starch synthase II-A1, wheat starch synthase II-B1 and wheat starch synthase II-D1 proteins, and also lacking expression of the wheat granule bound starch synthase-A1, wheat granule bound starch synthase-B1, and wheat granule bound starch synthase-D1 proteins (DMSW wheat), and wheat flours prepared from other types of wheat.

The wheat flour used in the present invention is wheat flour prepared from a type of wheat that does not express the three wheat starch synthase II proteins, and also does not express the three wheat granule bound starch synthase proteins, i.e., it is wheat flour obtained from wheat (hereinafter referred to as DMSW wheat) lacking expression of the wheat starch synthase II-A1, wheat starch synthase II-B1, and wheat starch synthase II-D1 proteins, and also lacking expression of the wheat granule bound starch synthase-A1, wheat granule bound starch synthase-B1, and wheat granule bound starch synthase-D1 proteins.

The above wheat can be any wheat lacking expression of the wheat starch synthase II-A1, wheat starch synthase II-B1, and wheat starch synthase II-D1 proteins, and also lacking expression of the wheat granule bound starch synthase-A1, wheat granule bound starch synthase-B1, and wheat granule bound starch synthase-D1 proteins.

In this case, the term "lacking expression" means that due to a mutation occurring in the genomic DNA thereof, synthesis of mRNA originating in the gene and synthesis of the enzyme protein itself do not occur. The above term also includes cases wherein, even if the protein is synthesized, a substitution or insertion, deletion, or other mutation arises in the amino acid sequence of the protein due to a mutation in the genomic DNA thereof, and all or part of the enzymatic function inherent in the wheat granule bound starch synthase proteins and wheat starch synthase II proteins, i.e., "the transfer of the glucose residue from the ADP-glucose substrate to the non-reducing end of the amylose recipient" or "the transfer of the glucose residue from the ADP-glucose substrate to the non-reducing end of the amylopectin recipient" is lost.

The above wheat can be obtained using any publicly known method of production and selection.

As one example, a method can be noted wherein a type of wheat lacking expression of the above three wheat starch synthase II proteins, and also lacking expression of the three wheat granule bound starch synthase proteins is selected from grains obtained by self-fertilization of F1 and subsequent generations of a type of wheat that was obtained by crossing wheat lacking the wheat starch synthase II proteins in accordance with the method described in Japanese Patent Application Laid-open No. 2005-333832 and a type waxy wheat obtained by the method described in Japanese Patent Application Laid-open No. H6-125669 following the methods described in Japanese Patent Application Laid-open Nos. 2005-333832 and H6-125669.

The present invention does not limit the crossing and selection method, and wheat obtained by an irradiation treatment or a chemical mutagenesis treatment, etc., or wheat obtained by gene recombination can be used. Furthermore, individuals among wheat lines that were raised using the above wheat parent crossing wheat lines and that lack expression of the above proteins can also be used. The wheat is selected using a method for detecting a mutation in the DNA thereof, or a method for qualitative and quantitative determination of the mRNA thereof by a reverse transcription reaction followed by PCR, or a method for qualitative or quantitative determination of the proteins contained in the grains thereof by SDS-PAGE, etc.

Wheat can also be used that is obtained by selecting the aforementioned type of wheat from progeny obtained by crossing the wheat obtained above and the wheat of another useful variety.

For example, it is possible to verify whether or not these proteins are expressed by detecting the presence or absence of the genes encoding the above three wheat starch synthase II proteins and the three wheat granule bound starch synthase proteins, or a mutation therein. Any method known to persons skilled in the art can be used as the method of verifying the expression of these proteins provided it is a method that can detect a mutation in the gene sequence, and examples thereof include methods such as PCR and the like.

The type of PCR method is not particularly limited herein, and various publicly known modified methods can be used. One example involves the mixing of a primer pair and template (test specimen) DNA together with reagents such as Tris-HCl, KCl, $MgCl_2$, various dNTP, and Taq DNA polymerase to make the PCR reaction solution. One cycle of DNA PCR consists of the three steps of heat denaturation, primer annealing, and a DNA synthesis reaction by DNA polymerase. Because each step requires a different reaction temperature and reaction time, suitable ranges are established depending on the base sequence and length of the DNA region to be amplified. A thermal cycler for such a procedure is commercially available. Detection sensitivity can be increased by an investigation of preferred PCR conditions such as the concentrations of Taq DNA polymerase and $MgCl_2$, the number of reaction cycles, etc., or the use of nested PCR.

The PCR reaction product can be identified using an immune reaction or can be identified by any other method, but if electrophoresis is performed, and clear bands can be recognized in an electrophoresis image using positive controls and negative controls whenever necessary, it is possible to verify the presence of the item to be detected (a gene encoding a protein and wheat carrying a genetic mutation) in the test sample.

The method described in Nakamura et al., Genome 45:1150-1156 (2002) can be used as the method for detecting mutations in the genes encoding the wheat granule bound starch synthase-A1, wheat granule bound starch synthase-B1, and wheat granule bound starch synthase-D1 proteins.

Examples of methods of detecting a mutation in genes encoding the wheat starch synthase II-A1, wheat starch synthase I-B1, wheat starch synthase II-D1, wheat granule bound starch synthase-A1, wheat granule bound starch synthase-B1, and wheat granule bound starch synthase-D1 proteins other than PCR include methods for qualitative or quantitative determination of the mRNA thereof by LAMP, NASBA, LCR, SDA, RCR, TMA, or RT-PCR.

The method described by Yamamori et al., Theor. Appl. Genet., 101:21-29 (2000) is one example of a method for verifying that the aforementioned wheat starch synthase II-A1, wheat starch synthase II-B1, and wheat starch synthase II-D1 proteins are not expressed.

The method described in Japanese Patent Application Laid-open No. H6-125669 can be used as the method for verifying that the aforementioned wheat granule bound starch synthase-A1, wheat granule bound starch synthase-B1, and wheat granule bound starch synthase-D1 proteins are not expressed.

The aforementioned DMSW wheat produced in this manner does not show a gelatinization peak or increase of viscosity, which are observed when heating a wheat flour obtained from generally used wheat (all of the wheat starch synthase II proteins and the wheat granule bound starch synthase proteins are expressed or partially thereof are expressed) or waxy wheat. Further, said wheat has a remarkably increased content of low molecular weight sugars such as glucose, maltose and sucrose, compared with wheat of usual type. Moreover, various properties are modified, including an average chain length of the branching chains of the amylopectin being shortened.

Examples of the wheat flour obtained from the aforementioned wheat used in the present invention include flour obtained by pulverizing whole wheat grains to produce a powder, or flour classified by a difference in particle size obtained by passing the powder through a sieve, or flour obtained by processing wheat into powder through a conventional flour milling process, and then mixing powders collected from specific outlets at a desired ratio. Or the wheat flour of the present invention also includes the starch purified therefrom.

The wheat flour obtained from DMSW wheat can be made into a cereal flour composition with other cereal flours, and this cereal flour composition can be used for the manufacture of various foods. Moreover, the wheat flour obtained from the DMSW wheat can be used for the manufacture of various foods along with other cereal flours.

The cereal flour composition of the present invention generally contains 0.5 to 30 wt % of the wheat flour obtained from DMSW wheat. The content of the wheat flour obtained from DMSW wheat is preferably at least 1 wt %, more preferably at least 2 wt % and still more preferably at least 5 wt %. The content of said wheat flour is preferably at most 20 wt %. Accordingly, said wheat flour can be contained in a range of 0.5 to 20 wt %. Further, a range of 1 to 20 wt % is preferable, and a range of 2 to 20 wt %, particularly a range of 5 to 20 is more preferable, and a range of 5 to 10 wt % is most preferable.

In the present invention, examples of cereal flours to be used with the wheat flour prepared from the DMSW wheat include wheat flour from non-waxy wheat, waxy wheat, rice flour, starch, buckwheat flour, barley flour, corn flour, and oat flour and the like. Wheat flour from non-waxy wheat includes general, commercially available hard flour, semi-hard flour, soft flour, durum semolina, or whole grain flour and the like. Among the above, the use of wheat flour from non-waxy wheat and durum semolina is preferred.

When food is manufactured, a suitable mix ratio of wheat flour (A) obtained from DMSW wheat and other cereal flours (B) by weight is an A:B range of 0.5:99.5 to 30:70, a range of 0.5:99.5 to 20:80 is more suitable, a range of 1:99 to 20:80 is even more suitable. Further a range of 2:98 to 20:80 is preferable, and a range of 5:95 to 20:80 is more preferable. A range of 5:95 to 10:90 is most preferable.

The foods manufactured in accordance the present invention are not particularly limited herein, and examples thereof include bakery goods, noodles, deep fried foods, foods cooked on a griddle, roux and sauces, and products comprising a paste of meat or fish.

Bakery goods refer to items that are produced by causing dough prepared with a base of wheat flour, etc., to rise using yeast, etc., and that are normally produced and sold in a bakery. Examples include breads such as conventional white bread, French bread, rolls, and pastries; deep-fried bread such as yeast doughnuts; steamed buns; pizza such as pizza pies; cakes such as sponge cake; and baked snacks such as cookies, biscuits, and the like.

Noodles refer to items produced by mixing salt, water, etc., with a base of wheat flour, etc., to obtain a kneaded dough, and after cutting off and shape-cutting a sheet thereof produced by rolling the dough with a rolling apparatus, etc., and depending on the intended use, processing by boiling, steaming, etc. Examples include udon noodles, Chinese soba, pasta, somen noodles, hiyamugi (cold) noodles, gyoza (pot sticker) wraps, shumai (steamed dumpling) wraps, and the like.

Moreover, the wheat flour obtained from the DMSW wheat and other cereal flour can be mixed and used as a coating and batter for deep fried foods.

Deep fried foods refer to items wherein salt, flavoring, leavening agent, egg yolk, water and the like are mixed together and sprinkled on base ingredients such as vegetables, meat, seafood, and the like, which is then deep fried in oil. Examples include various types of Japanese deep fried foods such as tempura, kara-age, kaki-age, furai, tatsuta-age, and the like.

Additionally, examples of foods cooked on a griddle include items such as ohban-yaki, tako-yaki, okonomi-yaki, dora-yaki and the like wherein wheat flour is mixed with thickener, leavening agent, egg yolk, water, and the main ingredients, etc., as needed, to make a liquid dough, which is then cooked on a griddle, etc.

Moreover, it is possible to mix the wheat flour obtained from the DMSW wheat and another cereal flour and, add that mixture as a thickener to roux and sauces. Examples of types of roux and sauces include curry sauce roux, hayashi (hash) sauce roux, stew sauce roux, and white sauce. Moreover, wheat flour obtained from the DMSW wheat and other cereal flour can be mixed together and used as the binder for products comprising a paste of meat or fish. Examples of such products comprising a paste of meat or fish include patties, and boiled fish paste sticks such as chikuwa and kamaboko.

In bakery goods, it is suitable to use the cereal flour composition containing wheat flour obtained from the DMSW wheat at a range of 0.5 to 30 wt %. In conventional white bread, for example, unique flavor and favorable sweetness, a preferred texture (softness, fluffiness, moistness, etc.) and superb melt-in-the-mouth sensation can be obtained by using a cereal flour composition containing wheat flour obtained from DMSW wheat especially in the range of 0.5 to 30 wt %, and more preferably 0.5 to 20 wt %. In sponge cakes, unique flavor and favorable sweetness are exhibited, and a very superb melt-in-the-mouth sensation can be obtained in spite of dry texture, by using a cereal flour composition containing wheat flour obtained from DMSW wheat especially in the range of 0.5 to 30 wt %.

In cookies, unique flavor and favorable sweetness are exhibited with less cracks on the surface, by using a cereal flour composition containing wheat flour obtained from DMSW wheat especially in the range of 0.5 to 30 wt %.

In general, a cereal flour composition containing wheat flour obtained from DMSW wheat in the range of 0.5 to 30 wt %, preferably 0.5 to 20 wt % can be suitably used in noodles. In the case of udon noodles, for example, a texture with a balance of unique flavor and softness and elasticity can be obtained by using a cereal flour composition containing wheat flour obtained from DMSW wheat in the range of 0.5 to 20 wt %.

In general, in foods cooked on a griddle it is suitable to use a cereal flour composition containing wheat flour obtained from DMSW wheat especially in the range of 0.5 to 30 wt %. In the case of ohban-yaki, for example, crispy and plump texture, and softness and a superb melt-in-the-mouth sensation even after cold storage can be obtained by using a cereal flour composition containing wheat flour obtained from DMSW wheat especially in the range of 0.5 to 20 wt %. In the case of tako-yaki, crispiness in crust, sweetness, a superb melt-in-the-mouth sensation with fragrant aroma can be obtained by using a cereal flour composition containing wheat flour obtained from DMSW wheat in the range of 0.5 to 30 wt %.

In fry batter for deep fried food, it is suitable to use a cereal flour composition containing wheat flour obtained from DMSW wheat especially in the range of 0.5 to 30 wt %, and particularly 0.5 to 20%. For example, in case of Japanese deep-fried food (tempura), tempura having unique flavor and short texture can be obtained by using a cereal flour composition containing wheat flour obtained from DMSW wheat in the range of 0.5 to 20 wt %.

The processes for producing various foods can be performed following conventional methods for those types of foods. All kinds of foods can be manufactured by properly selecting processing conditions other than inclusion of the aforementioned cereal flour such as the types of auxiliary ingredients to be used, types of additives to be used, mix ratio of the raw materials, processing temperature, processing time, and the like, and by using the manufacturing methods and equipment that are normally used.

Bakery goods, for example, can be produced by mixing various auxiliary ingredients that are normally used in the manufacture of bakery goods such as yeast, a chemical expander such as baking soda, yeast food, salt, sugar, oil or fat, egg, powdered milk, water and the like into the cereal flour composition of the present invention and kneading the same to prepare the dough. This is followed by either baking and frying the dough without rising or by letting the dough rise through fermentation, etc., and then baking or frying.

In the case of noodles, for example, dough is prepared by adding salt, water, and other auxiliary ingredients to the cereal flour composition of the present invention and kneading. The dough is made into a sheet by rolling the dough with a roller or rod-shaped item, and then the sheet is cut into a suitable size and shape. In the case of noodles such as udon, Chinese noodle and the like, the dough is boiled. Gyoza and shumai are manufactured by passing through the steps of wrapping the ingredients in the dough, and suitably frying, steaming, or boiling.

Deep fried foods are manufactured by the steps of suitably mixing auxiliary ingredients such as starch, salt, rising agent and the like into the cereal flour composition of the present invention, coating the main ingredients such as vegetables, meat, seafood, and the like with the mixture, and then deep frying in oil at a high temperature. Foods cooked on a griddle are manufactured by mixing salt, sugar, starch, rising agent, thickener, coloring, egg, the main ingredients, etc., into the cereal flour composition of the present invention to make a liquid dough, and then cooking the same on a heated griddle or hot plate. Roux and sauces are manufactured by mixing butter and margarine with the cereal flour composition of the present invention, frying, adding soup base or milk thereto, and then boiling the mixture down.

EXAMPLES

Test Materials

1. Preparation, Selection, and Milling of DMSW Wheat

The DMSW wheat used for the present invention was prepared as follows. First three wheat lines, i.e., the generally known wheat line Kanto No. 79 (a wheat line lacking the wheat starch synthase II-B1 protein) and the foreign varieties Turkey 116 (a wheat line lacking the wheat starch synthase II-D1 protein) and Chosen 57 (a wheat line lacking the wheat starch synthase II-A1 protein), were crossed in succession. A wheat line lacking all wheat starch synthase II proteins (but expressing all wheat granule bound starch synthase proteins) was selected from the progeny thereof, and that was used as one parent line. On the other hand, the Mochi-otome wheat line was crossed with the imported varieties, and a waxy wheat (not expressing any of the wheat granule bound starch synthase proteins, but expressing all wheat starch synthase II proteins) selected from the F5 generation thereof was used as the other parent line, and as a comparative example.

These two wheat lines were crossed as parent lines, and the F1 generation was obtained. This was self-fertilized, F2 and subsequent generations were obtained, and expression of the wheat starch synthase II proteins in these progeny was verified by PCR (see Japanese Patent Application Laid-open No. 2005-333832). Moreover, following the method shown in Japanese Patent Application Laid-open No. H6-125669, expression of the wheat granule bound starch synthase proteins was verified by two dimensional electrophoresis, and a wheat line was selected that does not express any of the wheat starch synthase II proteins, and does not express any of the wheat granule bound starch synthase proteins. Cultivation and crossing of all the wheat followed conventional methods.

A sufficient amount of these selected grains were proliferated and used for the raw material in the tests. The harvested wheat was sufficiently dried, then water was added in an amount of 1.5% on the basis of the weight of grains, and a short-tempering was carried out for 20 minutes, and it was milled in a experimental mill made by Buhler Inc. All the powdered flour obtained from outlets 1B, 2B, 3B, 1M, 2M, and 3M were mixed together to make a straight flour. The yield rate of this milling was 30%. The flour obtained thereby was used in the tests.

2. Commercially Available Wheat Flour

Eagle™ hard flour (Nippon Flour Mills), Heart™ soft flour (Nippon Flour Mills), Club™ soft flour (Nippon Flour Mills), and Sanuki Kiku™ all purpose flour (Nippon Flour Mills)

3. Wheat Flour from Norm 61 First Class Wheat (N61)

The Norin 61 wheat (a type expressing all wheat granule bound starch synthase proteins and all wheat starch synthase II proteins, hereinafter referred to as N61 wheat) was harvested in Gunma Prefecture in 2006. Water was added so that the water content of the harvested wheat reached 14%, and tempering was carried out one overnight, and it was milled in a experimental mill made by Buhler Inc. All the powdered flour obtained from outlets 1B, 2B, 3B, 1M, 2M, and 3M were mixed together to make a straight flour. The yield rate of this milling was 63%.

4. Wheat Flour from Waxy Wheat

The above waxy wheat cultivated at the National Agricultural Research Center for Tohoku Region was milled using the same procedure described above for the N61 wheat. The yield was 58%.

5. Waxy Cornstarch

This product is widely used as waxy starch.

[Measurement of Pasting Properties]

The pasting properties of the flour powders prepared as described above were measured using a rapid visco analyzer (RVA). An RVA-4 manufactured by NEWPORT SCIENTIFIC was used, and the measurement method followed the standard method stipulated by the American Association of Cereal Chemists (AACC Method 76-21). First 3.5 g dry weight of powder from the prepared wheat flour was weighed out, 25 mL of 1 mM silver nitrate was added, and after this was stirred ten times by up and down movement with a stirrer, it was set in the apparatus. The measurement conditions were follows: After the speed was raised once to 960 rpm at a sample temperature of 50° C., the speed was reduced to 160 rpm while maintaining the temperature at 50° C., and those conditions were continued for 1 minute. Then the temperature was raised to 95° C. at a rate of 3° C./min while maintaining the speed, and after 10 min at 95° C., the sample was cooled to 50° C. at a rate of 3° C./min. The change in viscosity (cP) over this time was measured, and a graph was prepared therefrom. FIG. 1 shows the graph. The gelatinization peak temperature of each sample is shown below.

|  | Peak temperature (° C.) |
| --- | --- |
| N61 wheat | 95.1 |
| Waxy wheat | 71.3 |
| DMSW wheat | — |

From these results it can be seen that the pasting properties of the DMSW wheat clearly show less gelatinization peak and almost no increased viscosity when heated, compared with conventional N61 wheat and waxy wheat. From these results, it can be seen that the DMSW wheat has distinctive features, which cannot be observed in conventional wheat at all.

[Measurement of Content of Maltose and Glucose]

For each of N61 wheat, waxy wheat and the DMSW wheat, 25 g of grains was crushed using Retsch Mill (Mitamura Riken Kogyo Co., Ltd., MRK-RETSCH ultra centrifugal mill) at 18,000 rpm with 0.75 mm screen to prepare whole grain flour. After measuring a water content of the flour, 500 µL of DMSO was added to per 10 mg of flour weight to mix well, and the mixture was boiled for 10 minutes, then 2 µL thereof was taken and dried under vacuum. To said sample, 2 µL of 1M Sodium Cyanoborohydride solution and 2 µL of APTS labeling reagent (Beckman Coulter Co., Ltd.) were added, and a reaction was carried out at 60° C. for 90 minutes in dark place, and then the reaction was stopped by adding 46 µL of distilled water. Further distilled water was added thereto to dilute 40 folds so as to prepare a sample for measurement. P/ACE system 5000 capillary electrophoresis apparatus manufactured by Beckman Coulter Co., Ltd. was used for analysis, and measurement was carried out according to a method described in PA800 sugar chain analysis kit manufactured by Beckman Coulter Co., Ltd. From a calibration curve that was previously prepared using a standard glucose and maltose, a concentration was calculated on the basis of a peak area of each of glucose and maltose to carry out the comparison between the samples.

|  | N61 wheat | Waxy wheat | DMSW wheat |
| --- | --- | --- | --- |
| Glucose content (wt %) | 0.039 | 0.057 | 0.161 |
| Maltose content (wt %) | 0.032 | 0.042 | 0.697 |

It can be seen that remarkably increased contents of glucose and maltose was observed in the DMSW wheat compared with N61 wheat and waxy wheat. For this reason, it seems that food products using flour prepared from DMSW wheat has unique sweetness and flavor.

Example 1

Manufacture of Conventional White Bread

Conventional white bread was manufactured using the following recipe (parts by weight).

| Wheat flour | 100 |
| Yeast food | 0.1 |
| Sugar | 5 |
| Salt | 2 |
| Skimmed milk | 2 |
| Shortening | 5 |
| Yeast | 2 |
| Water | 68 |

The wheat flour in the above recipe was composed of commercial wheat flour, wheat flour from DMSW wheat prepared as described above, wheat flour from N61 wheat, wheat flour from waxy wheat, and waxy cornstarch in the compositions (weight percent) shown in Table 1 below.

In this test Eagle™ hard flour (Nippon Flour Mills) was used as the commercial flour. In the composition table, the ingredients other than shortening were mixed in a mixer (SK MIXER CO., LTD., Type SK21C) for 2 min at low speed, 3 min at medium speed, and 1 min at high speed (27° C.). After the mixer was stopped and shortening was added, mixing was performed again for 1 min at low speed, 3 min at medium speed, and 5 min at high speed, and the kneaded dough was let rise for 60 min at 27° C. and 75% humidity. After the dough was punched down, rising was continued for 30 min under the same conditions, the dough was divided into 230 g portions, rolled into balls, and let stand for a bench time of 25 min. After the dough was reshaped in a molder, it was put into a shaped pan for final proofing until the dough had enlarged to about 80% of the pan in a rising chamber at 38° C. and 85% humidity, and then baked (205° C., 35 min). The baked bread was cooled by letting it stand for 1 hour at room temperature, placed into a plastic bag, let stand for 16 hours at room temperature, and sliced into 25 mm thick slices. Then an organoleptic evaluation was carried out.

The flavor and texture of the bread produced under the above conditions was evaluated on a 5-step scale by a ten member panel based on the following parameters and evaluation criteria, and an average score was calculated for each item.

Aroma
5. Fragrant and strong aroma
4. Rather strong aroma
3. Aroma can be sensed
2. No aroma
1. Unpleasant aroma Melt-in-the-Mouth Sensation
5. Very good melt-in-the-mouth sensation
4. Good melt-in-the-mouth sensation
3. Average melt-in-the-mouth sensation
2. Somewhat poor melt-in-the-mouth sensation
1. Poor melt-in-the-mouth sensation, remains in the mouth Taste
5. Strong delicious taste with flavor
4. Rather strong delicious taste
3. Slight delicious taste
2. No delicious taste
1. No delicious taste with acidity Sweetness
5. Extremely sweet
4. Rather extremely sweet
3. Rather sweet
2. Very slightly sweet
1. Sweetness lacking

TABLE 1

| | Wheat flour content in formula (wt %) | | | | | Evaluation parameter | | | |
| --- | --- | --- | --- | --- | --- | --- | --- | --- | --- |
| Example | Commercial wheat | DMSW wheat | N61 wheat | Waxy wheat | Waxy cornstarch | Aroma | Melt-in-the-mouth sensation | Taste | Sweetness |
| 1-1 | 100 | — | — | — | — | 2.4 | 3.2 | 2.4 | 1.9 |
| 1-2 | 99.5 | 0.5 | — | — | — | 2.5 | 3.2 | 2.3 | 2.1 |
| 1-3 | 99 | 1 | — | — | — | 2.6 | 3.5 | 2.5 | 2.2 |
| 1-4 | 98 | 2 | — | — | — | 2.7 | 3.6 | 2.5 | 2.4 |
| 1-5 | 95 | 5 | — | — | — | 2.8 | 3.9 | 2.6 | 2.4 |
| 1-6 | 90 | 10 | — | — | — | 3.1 | 4.2 | 3.0 | 2.7 |
| 1-7 | 80 | 20 | — | — | — | 3.5 | 4.6 | 3.3 | 3.0 |
| 1-8 | 70 | 30 | — | — | — | 3.9 | 4.0 | 3.6 | 3.4 |
| 1-9 | 60 | 40 | — | — | — | 4.2 | 3.1 | 3.8 | 4.1 |
| 1-10 | 0 | 100 | — | — | — | 3.4 | 1.3 | 3.8 | 4.2 |
| 1-11 | 90 | — | 10 | — | — | 2.2 | 2.6 | 2.0 | 1.8 |
| 1-12 | 90 | — | — | 10 | — | 2.1 | 2.4 | 2.0 | 2.1 |
| 1-13 | 90 | — | — | — | 10 | 2.0 | 2.2 | 2.1 | 1.8 |

After a portion of the above sliced bread was stored under refrigeration at 4° C. for 24 hours, the hardness of the bread surface was measured using a texture analyzer (STABLE MICRO SYSTEMS, TA, XT, plus). The machine was set so that an aluminum plunger (diameter 36 mm) would approach near the center of the sliced bread, and the bread was compressed with the plunger at a speed of 100 mm/min at a compression of 10 mm (40%). The load on the plunger was measured at a compression of 6.25 mm (25%). The measurement was performed on each sample 3 times, and the average values are summarized in Table 2. A lower numerical value indicates greater softness.

TABLE 2

| | Wheat flour content in formula (wt %) | | | | | |
| --- | --- | --- | --- | --- | --- | --- |
| Example | Commercial wheat | DMSW wheat | N61 wheat | Waxy wheat | Waxy cornstarch | Hardness |
| 1-1 | 100 | — | — | — | — | 554 |
| 1-6 | 90 | 10 | — | — | — | 464 |
| 1-11 | 90 | — | 10 | — | — | 628 |
| 1-12 | 90 | — | — | 10 | — | 486 |
| 1-13 | 90 | — | — | — | 10 | 658 |

Bread using wheat flour from DMSW wheat has much sweetness and much softer texture, and superb melt-in-themouth sensation, than bread wherein N61 wheat flour, waxy wheat flour or waxy cornstarch was added to conventional wheat flour. In addition, this tendency is retained even after storage under refrigeration for 24 hours.

It was observed that melt-in-the-mouth sensation became deteriorated when the content of wheat flour from DMSW wheat in total wheat flour was too increased. Accordingly, the content of wheat flour from DMSW wheat appears to range suitably from 0.5 to 30 wt % in a weight of total wheat flour.

Example 2

Manufacture of Sponge Cake

Sponge cake was manufactured using the following recipe (parts by weight).

| | |
|---|---|
| Wheat flour | 100 |
| Granulated sugar | 125 |
| Whole egg | 175 |

The wheat flour in the above recipe was composed of commercial wheat flour, wheat flour from DMSW wheat prepared as described above, wheat flour from N61 wheat, wheat flour from waxy wheat, and waxy cornstarch in the compositions (weight percent) shown in Table 3 below.

In this test Heart™ soft flour (Nippon Flour Mills) was used as the commercial flour. The process is as follows. The amount of whole egg necessary for the test was beaten beforehand and kept warm at 25° C. To 175 g of whole egg was added 125 g of granulated sugar and the mixture was mixed at low speed for 1 min, at high speed for 10 min, and again at low speed for 1 min. Following the compositions in Table 3, flour that had been mixed and sifted beforehand was added, and mixing was carried out at low speed for 30 sec. After the flour clinging to the walls was scraped down into the mixing bowl, mixing was resumed at low speed for 30 sec. The dough (360 g) was poured into a mold and baked for 30 min with a top setting of 185° C. and a bottom setting of 180° C. After the baked sponge cake was removed from the mold and let stand at room temperature for 30 min to cool, it was let stand at room temperature, and an organoleptic evaluation was performed the next day. The organoleptic evaluation was carried out by ten panelists based on the following parameters and evaluation criteria, and an average score was calculated for each item. The same evaluation was carried out after the manufactured sponge cake had been stored in a refrigerator at 4° C. for 24 hours. Table 3 shows the results after storage at room temperature, and Table 4 shows the results after storage under refrigeration.

Aroma
5. Fragrant and strong aroma
4. Rather strong aroma
3. Aroma can be sensed
2. No aroma
1. Unpleasant aroma Melt-in-the-Mouth Sensation
5. Very good melt-in-the-mouth sensation
4. Good melt-in-the-mouth sensation
3. Average melt-in-the-mouth sensation
2. Somewhat poor melt-in-the-mouth sensation
1. Poor melt-in-the-mouth sensation, remains in the mouth Taste
5. Sweet and unique taste extremely sensed
4. Extremely sweet and unique taste sensed
3. Rather extremely sweet
2. Sweet
1. Slightly sweet

TABLE 3

| Examples | Wheat flour content in formula (wt %) | | | | | Evaluation parameter | | |
|---|---|---|---|---|---|---|---|---|
| stored at room temp. | Commercial wheat | DMSW wheat | N61 wheat | Waxy wheat | Waxy cornstarch | Aroma | Melt-in-the-mouth sensation | Taste |
| 2-1 | 100 | — | — | — | — | 3 | 3 | 2 |
| 2-2 | 99.5 | 0.5 | — | — | — | 3.1 | 3 | 2.2 |
| 2-3 | 99 | 1 | — | — | — | 3.1 | 3.2 | 2.3 |
| 2-4 | 98 | 2 | — | — | — | 3.2 | 3.2 | 2.6 |
| 2-5 | 95 | 5 | — | — | — | 3.5 | 3.5 | 3 |
| 2-6 | 90 | 10 | — | — | — | 4.1 | 3.9 | 3.3 |
| 2-7 | 80 | 20 | — | — | — | 4.2 | 4.2 | 3.7 |
| 2-8 | 70 | 30 | — | — | — | 4.4 | 3.7 | 4.3 |
| 2-9 | 60 | 40 | — | — | — | 4.5 | 3.2 | 4.4 |
| 2-10 | 50 | 50 | — | — | — | 4.6 | 2.5 | 4.5 |
| 2-11 | 0 | 100 | — | — | — | 2.3 | 1.8 | 4.5 |
| 2-12 | 90 | — | 10 | — | — | 2.8 | 2.5 | 2.1 |
| 2-13 | 90 | — | — | 10 | — | 3.6 | 2.1 | 2.5 |
| 2-14 | 90 | — | — | — | 10 | 2.7 | 2 | 2.7 |

TABLE 4

| Examples | Wheat flour content in formula (wt %) | | | | | Evaluation parameter | | |
|---|---|---|---|---|---|---|---|---|
| stored in refrigerator | Commercial wheat | DMSW wheat | N61 wheat | Waxy wheat | Waxy cornstarch | Aroma | Melt-in-the-mouth sensation | Taste |
| 2-1 | 100 | — | — | — | — | 2.5 | 2.1 | 2 |
| 2-2 | 99.5 | 0.5 | — | — | — | 2.3 | 2.3 | 1.9 |
| 2-3 | 99 | 1 | — | — | — | 2.4 | 2.2 | 2 |
| 2-4 | 98 | 2 | — | — | — | 2.7 | 2.5 | 2.2 |
| 2-5 | 95 | 5 | — | — | — | 2.6 | 2.8 | 2.5 |
| 2-6 | 90 | 10 | — | — | — | 3 | 3.1 | 2.9 |

TABLE 4-continued

| Examples stored in refrigerator | Wheat flour content in formula (wt %) | | | | | Evaluation parameter | | |
|---|---|---|---|---|---|---|---|---|
| | Commercial wheat | DMSW wheat | N61 wheat | Waxy wheat | Waxy cornstarch | Aroma | Melt-in-the-mouth sensation | Taste |
| 2-7 | 80 | 20 | — | — | — | 3.3 | 3.2 | 3.3 |
| 2-8 | 70 | 30 | — | — | — | 3.5 | 3.5 | 3.6 |
| 2-9 | 60 | 40 | — | — | — | 3.4 | 3.1 | 4.1 |
| 2-10 | 50 | 50 | — | — | — | 3.6 | 2.7 | 4.4 |
| 2-11 | 0 | 100 | — | — | — | 1.7 | 1.3 | 4.4 |
| 2-12 | 90 | — | 10 | — | — | 2.1 | 1.9 | 2.2 |
| 2-13 | 90 | — | — | 10 | — | 2.2 | 1.5 | 2.3 |
| 2-14 | 90 | — | — | — | 10 | 2 | 1.4 | 2.5 |

From these results it is clear that when wheat flour from the DMSW wheat is used, a product having unique flavor and sweetness, and fluffiness and superb melt-in-the-mouth sensation can be obtained. In addition, this tendency is retained even after storage under refrigeration for 24 hours.

It was observed that the volume of a product became poor and a mass was easily generated in mouth when the content of wheat flour from DMSW wheat in total wheat flour was too increased. Accordingly, from this viewpoint, the content of wheat flour from DMSW wheat appears to range suitably from 0.5 to 30 wt % in a weight of total wheat flour.

Example 3

Manufacture of Cookies

Cookies were manufactured using the following recipe (parts by weight).

| | |
|---|---|
| Wheat flour | 150 |
| Granulated sugar | 75 |
| Nonfat powdered milk | 5 |
| Salt | 1 |
| Shortening | 50 |
| Baking soda | 0.6 |
| Ammonium bicarbonate | 0.8 |
| Water | 30 |

The wheat flour in the above recipe was composed of commercial wheat flour, wheat flour from DMSW wheat prepared as described above, wheat flour from N61 wheat, wheat flour from waxy wheat, and waxy cornstarch in the compositions (weight percent) shown in Table 5 below.

In this test Heart™ soft flour (Nippon Flour Mills) was used as the commercial flour. The process is as follows. The required amounts of granulated sugar, skimmed milk, salt, shortening, baking soda, ammonium bicarbonate, and water were combined and mixed in a mixer at low speed for 1 min. Then mixing was carried out at high speed for 4 min, and after the flour clinging to the walls was scraped down into the mixing bowl, mixing was resumed for 4 min. After the weighed out amount of wheat flour was added and mixing was carried out at low speed for 30 seconds, the flour clinging to the walls was scraped down into the mixing bowl, and mixing was resumed at low speed for 30 seconds. The dough was removed from the mixer, folded together, and shaped into a rod. This rod-shaped dough was divided into six parts and each part was spread out on an aluminum plate to a thickness of 6 mm. Cookies were cut in round shapes 6 cm in diameter and baked for 12 minutes (top setting 200° C., bottom setting 210° C.). After the cookies were let stand to cool at room temperature for 15 min/side, they were placed in a plastic bag and stored at room temperature. An organoleptic evaluation was carried out the next day. Evaluation on a 5-step scale was carried out by a ten member panel based on the following parameters and evaluation criteria, and an average score was calculated for each item. The results are shown in Table 5.

Aroma
5. Fragrant and strong aroma
4. Rather strong aroma
3. Aroma can be sensed
2. No aroma
1. Unpleasant aroma Melt-in-the-Mouth Sensation
5. Very good melt-in-the-mouth sensation
4. Good melt-in-the-mouth sensation
3. Average melt-in-the-mouth sensation
2. Somewhat poor melt-in-the-mouth sensation
1. Poor melt-in-the-mouth sensation, remains in the mouth Sweetness
5. Very extremely sweet
4. Extremely sweet
3. Rather extremely sweet
2. Sweet
1. Less sweet Texture
5. Considerably soft
4. Slightly soft
3. Right amount of hardness
2. Slightly hard
1. Hard and crumbly

TABLE 5

| Examples | Wheat flour content in formula (wt %) | | | | | Evaluation parameter | | | |
|---|---|---|---|---|---|---|---|---|---|
| | Commercial wheat | DMSW wheat | N61 wheat | Waxy wheat | Waxy cornstarch | Aroma | Melt-in-the-mouth sensation | Sweetness | Texture |
| 3-1 | 100 | — | — | — | — | 3.2 | 3 | 3.1 | 3.1 |
| 3-2 | 99.5 | 0.5 | — | — | — | 3.4 | 3.3 | 3.3 | 3 |
| 3-3 | 99 | 1 | — | — | — | 3.4 | 3.2 | 3.2 | 3 |
| 3-4 | 98 | 2 | — | — | — | 3.5 | 3.4 | 3.5 | 2.9 |
| 3-5 | 95 | 5 | — | — | — | 3.6 | 3.7 | 3.7 | 2.8 |

TABLE 5-continued

| Examples | Wheat flour content in formula (wt %) | | | | | Evaluation parameter | | | |
| --- | --- | --- | --- | --- | --- | --- | --- | --- | --- |
| | Commercial wheat | DMSW wheat | N61 wheat | Waxy wheat | Waxy cornstarch | Aroma | Melt-in-the-mouth sensation | Sweetness | Texture |
| 3-6 | 90 | 10 | — | — | — | 3.6 | 3.7 | 3.9 | 2.8 |
| 3-7 | 80 | 20 | — | — | — | 3.9 | 4 | 4.1 | 2.6 |
| 3-8 | 70 | 30 | — | — | — | 4 | 3.6 | 4.3 | 2.5 |
| 3-9 | 60 | 40 | — | — | — | 4.2 | 3.4 | 4.4 | 2.2 |
| 3-10 | 50 | 50 | — | — | — | 4.4 | 2.7 | 4.5 | 1.8 |
| 3-11 | 40 | 60 | | | | 4.4 | 2.5 | 4.7 | 1.8 |
| 3-12 | 30 | 70 | | | | 4.5 | 2.5 | 4.8 | 1.7 |
| 3-13 | 0 | 100 | — | — | — | 5 | 1.4 | 4.8 | 1.3 |
| 3-14 | 90 | — | 10 | — | — | 3 | 3.1 | 2.9 | 3.2 |
| 3-15 | 90 | — | — | 10 | — | 2.9 | 2.7 | 3.2 | 3.6 |
| 3-16 | 90 | — | — | — | 10 | 3.1 | 2.5 | 3.3 | 3.2 |

From these results it is clear that when wheat flour from the DMSW wheat is used, the product has a unique flavor and firm consistency to chew, and also superb melt-in-the-mouth sensation.

It was observed that an aftertaste of the product became remained acridity when the content of wheat flour from DMSW wheat in total wheat flour was too increased. Accordingly, the content of wheat flour from DMSW wheat appears to range suitably from 0.5 to 30 wt % in a weight of total wheat flour.

Example 4

Manufacture of ohban-yaki

A Small Round Pancake Filled with Sweet Bean Paste

Ohban-yaki were manufactured using the following recipe (parts by weight).

| | |
| --- | --- |
| Wheat flour | 89 |
| Sugar | 3 |
| Glucose | 5 |
| Baking powder | 3 |
| Water | 120 |

The wheat flour in the above recipe was composed of commercial wheat flour, wheat flour from DMSW wheat prepared as described above, wheat flour from N61 wheat, wheat flour from waxy wheat, and waxy cornstarch in the compositions (weight percent) shown in Table 6 below.

In this test Club™ soft flour (Nippon Flour Mills) was used as the commercial flour. The process is as follows. The ingredients in the above recipe were mixed together and stirred with a whisk to make batter. The batter was poured onto the griddle of an ohban-yaki maker set to 180° C., bean jam was placed over the batter, and after cooking for 5.5 min, the griddle was flipped over and cooking was continued for another 5.5 min. An organoleptic evaluation was carried out on the cooked ohban-yaki immediately after preparation and on ohban-yaki that were placed in a refrigerator for 24 hours after cooking and then warmed in a microwave oven. The organoleptic evaluation was carried out using a 5-step scale by a ten member panel based on the following parameters and evaluation criteria, and an average score was calculated for each item. Table 6 shows the results immediately after cooking, and Table 7 shows the results after storing under refrigeration.

Aroma
5. Fragrant and strong aroma
4. Rather strong aroma
3. Aroma can be sensed
2. No aroma
1. Unpleasant aroma Melt-in-the-Mouth Sensation
5. Very good melt-in-the-mouth sensation
4. Good melt-in-the-mouth sensation
3. Average melt-in-the-mouth sensation
2. Somewhat poor melt-in-the-mouth sensation
1. Poor melt-in-the-mouth sensation, remains in the mouth Sweetness
5. Very extremely sweet
4. Extremely sweet
3. Rather extremely sweet
2. Sweet
1. Less sweet

TABLE 6

| Examples immediately after cooking | Wheat flour content in formula (wt %) | | | | | Evaluation parameter | | |
| --- | --- | --- | --- | --- | --- | --- | --- | --- |
| | Commercial wheat | DMSW wheat | N61 wheat | Waxy wheat | Waxy cornstarch | Aroma | Melt-in-the-mouth sensation | Sweetness |
| 4-1 | 100 | — | — | — | — | 4.1 | 3.1 | 3.2 |
| 4-2 | 99.5 | 0.5 | — | — | — | 4.2 | 3.0 | 3.3 |
| 4-3 | 99 | 1 | — | — | — | 4.3 | 3.1 | 3.3 |
| 4-4 | 98 | 2 | — | — | — | 4.2 | 3.3 | 3.4 |
| 4-5 | 95 | 5 | — | — | — | 4.4 | 3.6 | 3.5 |
| 4-6 | 90 | 10 | — | — | — | 4.6 | 3.6 | 3.9 |
| 4-7 | 80 | 20 | — | — | — | 4.8 | 3.4 | 4.2 |
| 4-8 | 70 | 30 | — | — | — | 4.9 | 2.7 | 4.4 |
| 4-9 | 60 | 40 | — | — | — | 4.9 | 2.1 | 4.5 |
| 4-10 | 50 | 50 | — | — | — | 5.0 | 1.9 | 4.9 |

TABLE 6-continued

| Examples immediately after cooking | Wheat flour content in formula (wt %) | | | | | Evaluation parameter | | |
|---|---|---|---|---|---|---|---|---|
| | Commercial wheat | DMSW wheat | N61 wheat | Waxy wheat | Waxy cornstarch | Aroma | Melt-in-the-mouth sensation | Sweetness |
| 4-11 | 0 | 100 | — | — | — | 1.8 | 1.6 | 5.0 |
| 4-12 | 90 | — | 10 | — | — | 3.8 | 2.5 | 2.8 |
| 4-13 | 90 | — | — | 10 | — | 4.0 | 2.3 | 2.6 |
| 4-14 | 90 | — | — | — | 10 | 3.8 | 2.4 | 2.5 |

TABLE 7

| Examples after storage in refrigerator | Wheat flour content in formula (wt %) | | | | | Evaluation parameter | | |
|---|---|---|---|---|---|---|---|---|
| | Commercial wheat | DMSW wheat | N61 wheat | Waxy wheat | Waxy cornstarch | Aroma | Melt-in-the-mouth sensation | Sweetness |
| 4-1 | 100 | — | — | — | — | 3.1 | 2.3 | 2.8 |
| 4-2 | 99.5 | 0.5 | — | — | — | 3.0 | 2.4 | 2.9 |
| 4-3 | 99 | 1 | — | — | — | 2.9 | 2.4 | 2.8 |
| 4-4 | 98 | 2 | — | — | — | 3.1 | 2.4 | 3.1 |
| 4-5 | 95 | 5 | — | — | — | 3.1 | 2.6 | 3.2 |
| 4-6 | 90 | 10 | — | — | — | 3.3 | 2.5 | 3.6 |
| 4-7 | 80 | 20 | — | — | — | 3.4 | 2.2 | 3.8 |
| 4-8 | 70 | 30 | — | — | — | 3.6 | 2.2 | 3.9 |
| 4-9 | 60 | 40 | — | — | — | 3.8 | 1.6 | 4.1 |
| 4-10 | 50 | 50 | — | — | — | 3.4 | 1.4 | 4.5 |
| 4-11 | 0 | 100 | — | — | — | 1.3 | 1.3 | 5.0 |
| 4-12 | 90 | — | 10 | — | — | 2.4 | 2.0 | 2.6 |
| 4-13 | 90 | — | — | 10 | — | 2.8 | 2.1 | 2.6 |
| 4-14 | 90 | — | — | — | 10 | 2.5 | 2.3 | 2.4 |

From the above results it is clear that when flour from the DMSW wheat is used, the product has a plump texture after grilled with good crispiness, and also a unique flavor. In addition, this tendency of excellent flavor and texture is retained even after storage under refrigeration for 24 hours.

From a viewpoint of melt-in-the-mouth sensation, the content of wheat flour from DMSW wheat appears to be up to 20 wt % suitably, and range from 0.5 to 20 wt % in a weight of total wheat flour.

Example 5

Manufacture of Tako-Yaki

A Dumpling Made of Batter, Diced Octopus, and Flavorings

Tako-yaki were manufactured using the following recipe (parts by weight).

| | |
|---|---|
| Wheat flour | 92 |
| Glucose | 3 |
| Granulated sugar | 2 |
| Salt | 2 |
| Powdered dried bonito | 1 |
| Water | 210 |
| Egg | 5 |

The wheat flour in the above recipe was composed of commercial wheat flour, wheat flour from DMSW wheat prepared as described above, wheat flour from N61 wheat, wheat flour from waxy wheat, and waxy cornstarch in the compositions (weight percent) shown in Table 8 below.

In this test Club™ soft flour (Nippon Flour Mills) was used as the commercial flour. The process is as follows. The ingredients in the table were mixed together and stirred with a whisk to make batter. The batter was poured onto the griddle of a tako-yaki maker set to 180° C., and after cooking for 4 min, a hot shaping griddle heated to 180° C. was placed on top and cooking was continued for another 1 min. An organoleptic evaluation was carried out on the cooked tako-yaki immediately after preparation and on tako-yaki that were placed in a freezer at −20° C. for 24 hours after cooking and then warmed in a microwave oven. The organoleptic evaluation was carried out using a 5-step scale by a ten member panel based on the following parameters and evaluation criteria, and an average score was calculated for each item. Table 8 shows the results immediately after cooking, and Table 9 shows the results after frozen storage.

Aroma
5. Fragrant and strong aroma
4. Rather strong aroma
3. Aroma can be sensed
2. No aroma
1. Unpleasant aroma Melt-in-the-Mouth Sensation
5. Very good melt-in-the-mouth sensation
4. Good melt-in-the-mouth sensation
3. Average melt-in-the-mouth sensation
2. Somewhat poor melt-in-the-mouth sensation
1. Poor melt-in-the-mouth sensation, remains in the mouth Sweetness
5. Very extremely sweet
4. Extremely sweet
3. Rather extremely sweet
2. Sweet
1. Less sweet Surface Texture
5. Considerably crispy and firm to chew
4. Crispy
3. Rather crispy
2. Rather soft and less firm to chew
1. Too soft and no firmness to chew

TABLE 8

| Examples immediately after cooking | Wheat flour content in formula (wt %) | | | | | Evaluation parameter | | | |
|---|---|---|---|---|---|---|---|---|---|
| | Commercial wheat | DMSW wheat | N61 wheat | Waxy wheat | Waxy cornstarch | Aroma | Melt-in-the-mouth sensation | Sweetness | Surface texture |
| 5-1  | 100  | —   | — | —  | —  | 3.3 | 3.1 | 2.5 | 3.6 |
| 5-2  | 99.5 | 0.5 | — | —  | —  | 3.4 | 3.1 | 2.6 | 3.8 |
| 5-3  | 99   | 1   | — | —  | —  | 3.5 | 3.1 | 2.6 | 3.9 |
| 5-4  | 98   | 2   | — | —  | —  | 3.5 | 3.2 | 2.7 | 4.2 |
| 5-5  | 95   | 5   | — | —  | —  | 3.7 | 3.4 | 2.9 | 4.4 |
| 5-6  | 90   | 10  | — | —  | —  | 3.9 | 3.6 | 3.1 | 4.8 |
| 5-7  | 80   | 20  | — | —  | —  | 4.0 | 3.8 | 3.4 | 4.1 |
| 5-8  | 70   | 30  | — | —  | —  | 4.4 | 3.4 | 3.6 | 3.7 |
| 5-9  | 60   | 40  | — | —  | —  | 4.7 | 2.8 | 3.7 | 3.5 |
| 5-10 | 50   | 50  | — | —  | —  | 4.8 | 2.2 | 4.0 | 3.2 |
| 5-11 | 0    | 100 | — | —  | —  | 5.0 | 1.5 | 4.5 | 1.7 |
| 5-12 | 90   | —   | 10 | —  | —  | 3.1 | 2.9 | 2.8 | 3.4 |
| 5-13 | 90   | —   | — | 10 | —  | 3.1 | 2.9 | 3.4 | 2.9 |
| 5-14 | 90   | —   | — | —  | 10 | 2.8 | 2.7 | 3.1 | 2.5 |

TABLE 9

| Examples after frozen storage | Wheat flour content in formula (wt %) | | | | | Evaluation parameter | | | |
|---|---|---|---|---|---|---|---|---|---|
| | Commercial wheat | DMSW wheat | N61 wheat | Waxy wheat | Waxy cornstarch | Aroma | Melt-in-the-mouth sensation | Sweetness | Surface texture |
| 5-1  | 100  | —   | — | —  | —  | 2.8 | 2.4 | 2.4 | 2.5 |
| 5-2  | 99.5 | 0.5 | — | —  | —  | 2.6 | 2.3 | 2.4 | 2.7 |
| 5-3  | 99   | 1   | — | —  | —  | 2.7 | 2.4 | 2.4 | 2.9 |
| 5-4  | 98   | 2   | — | —  | —  | 2.8 | 2.6 | 2.6 | 3.0 |
| 5-5  | 95   | 5   | — | —  | —  | 3.0 | 2.9 | 2.8 | 3.3 |
| 5-6  | 90   | 10  | — | —  | —  | 3.2 | 3.0 | 2.9 | 3.6 |
| 5-7  | 80   | 20  | — | —  | —  | 3.5 | 2.6 | 3.1 | 3.6 |
| 5-8  | 70   | 30  | — | —  | —  | 3.6 | 2.4 | 3.3 | 3.1 |
| 5-9  | 60   | 40  | — | —  | —  | 3.9 | 1.9 | 3.5 | 3.0 |
| 5-10 | 50   | 50  | — | —  | —  | 4.1 | 1.5 | 3.8 | 2.6 |
| 5-11 | 0    | 100 | — | —  | —  | 4.7 | 1.2 | 4.2 | 1.1 |
| 5-12 | 90   | —   | 10 | —  | —  | 2.5 | 2.2 | 2.0 | 2.6 |
| 5-13 | 90   | —   | — | 10 | —  | 2.6 | 2.2 | 2.3 | 2.2 |
| 5-14 | 90   | —   | — | —  | 10 | 2.4 | 2.0 | 2.1 | 1.9 |

From the above results it is clear that when flour from DMSW wheat is used, the surface of the product becomes crispy and fragrant, on the other hand, an inner part of the product has creamy texture, the product having further unique sweetness and flavor. In addition, this tendency is retained even after frozen storage. It was observed that melt-in-the-mouth sensation became deteriorated when the content of wheat flour from DMSW wheat in total wheat flour was too increased. Accordingly, the content of wheat flour from DMSW wheat appears to be suitably at most 40 wt % and preferably range from 0.5 to 30 wt % in a weight of total wheat flour.

Example 6

Manufacture of Udon Noodles

Udon noodles were manufactured using the following recipe (parts by weight).

| | |
|---|---|
| Wheat flour | 500 |
| Salt | 10 |
| Water | 170 |

The wheat flour in the above recipe was composed of commercial wheat flour, wheat flour from DMSW wheat prepared as described above, wheat flour from N61 wheat, and in the compositions (weight percent) shown in Table 10 below.

In this test Sanuki Kiku™ (Nippon Flour Mills) was used as the commercial flour. The process is as follows. Water with the salt dissolved therein was added to the wheat flour in a mixer with stirring, and the mixture was kneaded for 5 min. The small crumbs of dough were shaped by passing them through a noodle roll. Compounding was carried out by folding the formed dough and passing it through the noodle roll again. Then the dough was spread until it reached a thickness of 2.5 mm. The sheet was then cut using a No. 10 square bladed roller and stored at 4° C. Water with an adjusted pH was boiled, and after the noodles were cooked in the boiling water for 21 min, the noodles were unraveled in cold water, placed on a bamboo basket, covered with plastic wrap, and let stand 30 min at room temperature. An organoleptic evaluation of the udon prepared in the above manner was carried out by a ten member panel based on the following parameters and evaluation criteria using example 6-1, which had a commercial flour content of 100 wt % as the flour component, as a reference standard. An average score was calculated for each item. Table 10 shows the results.

Softness

5. Soft
4. Rather soft
3. Medium soft
2. Rather hard
1. Hard

Viscoelasticity
5. Excellent viscoelasticity
4. Rather good viscoelasticity
3. Medium viscoelasticity
2. Rather poor viscoelasticity
1. Poor viscoelasticity
Flavor
5. Extreme flavor
4. Rather extreme flavor
3. Medium flavor
2. Rather poor flavor
1. No flavor

TABLE 10

| Examples | Wheat flour content in formula (wt %) | | | | Evaluation parameter | | |
| --- | --- | --- | --- | --- | --- | --- | --- |
| | Commercial wheat | DMSW wheat | N61 wheat | Waxy wheat | Softness | Visco-elasticity | Flavor |
| 6-1 | 100 | — | — | — | 3.0 | 3.0 | 3.0 |
| 6-2 | 99.5 | 0.5 | — | — | 3.2 | 3.0 | 3.0 |
| 6-3 | 99 | 1 | — | — | 3.2 | 2.9 | 3.2 |
| 6-4 | 98 | 2 | — | — | 3.4 | 2.9 | 3.3 |
| 6-5 | 95 | 5 | — | — | 3.5 | 2.7 | 3.4 |
| 6-6 | 90 | 10 | — | — | 3.7 | 2.5 | 3.6 |
| 6-7 | 80 | 20 | — | — | 4.0 | 2.4 | 3.9 |
| 6-8 | 70 | 30 | — | — | 4.4 | 1.9 | 4.0 |
| 6-9 | 0 | 100 | — | — | 4.8 | 1.2 | 4.5 |
| 6-10 | 90 | — | 10 | — | 3.1 | 2.9 | 3.1 |
| 6-11 | 90 | — | — | 10 | 3.2 | 3.6 | 3.0 |

From the above results it is clear that when flour from DMSW wheat is used, the product has unique flavor and further soft texture. Such a product is suitable for a consumer who likes easily chewable texture, for example, especially an elderly person. It was observed that udon noodles tended to become dull color and fragile degree while boiling became large when the content of wheat flour from DMSW wheat in total wheat flour was too increased. Accordingly, the content of wheat flour from DMSW wheat appears to preferably range from 0.5 to 20 wt % in a weight of total wheat flour.

Example 7

Manufacture of Japanese Deep Fried Food

Tempura

Tempura was manufactured using the following recipe (parts by weight).

| Wheat flour | 100 |
| --- | --- |
| Water | 160 |

The wheat flour in the above recipe was composed of commercial wheat flour, wheat flour from DMSW wheat prepared as described above, wheat flour from N61 wheat, and in the compositions (weight percent) shown in Table below.

In this test Daiya™ flour (Nippon Flour Mills) was used as the commercial flour. The process is as follows. The materials was mixed according to the above table, and stirred using a whipping machine to prepare batter. Sliced sweet potato as raw material, was immersed into the batter, and then the material was introduced into a flier containing oil heated at 170 to 180° C., and fried for 3 min. An organoleptic evaluation of the tempura prepared in the above manner was carried out by a ten member panel based on the following parameters and evaluation criteria using example 7-1, which had a commercial flour content of 100 wt % as the flour component, as a reference standard. An average score was calculated for each item. Table 11 shows the results.

Fried Color
5. Deep
4. Rather deep
3. Medium color
2. Rather light
1. Light
Texture
5. Extremely short texture
4. Rather short texture
3. Medium short texture
2. Rather poor in short texture
1. Poor in short texture
Flavor
5. Extreme flavor
4. Rather extreme flavor
3. Medium flavor
2. Rather poor flavor
1. No flavor sensed

TABLE 11

| Examples | Wheat flour content in formula (wt %) | | | | Evaluation parameter | | |
| --- | --- | --- | --- | --- | --- | --- | --- |
| | Commercial wheat | DMSW wheat | N61 wheat | Waxy wheat | Fried color | Texture | Flavor |
| 7-1 | 100 | — | — | — | 3.0 | 3.0 | 3.0 |
| 7-2 | 99.5 | 0.5 | — | — | 3.0 | 2.8 | 3.2 |
| 7-3 | 99 | 1 | — | — | 3.2 | 2.9 | 3.2 |
| 7-4 | 98 | 2 | — | — | 3.3 | 3.1 | 3.4 |
| 7-5 | 95 | 5 | — | — | 3.3 | 3.1 | 3.6 |
| 7-6 | 90 | 10 | — | — | 3.7 | 3.3 | 3.9 |

TABLE 11-continued

| | Wheat flour content in formula (wt %) | | | | Evaluation parameter | | |
|---|---|---|---|---|---|---|---|
| Examples | Commercial wheat | DMSW wheat | N61 wheat | Waxy wheat | Fried color | Texture | Flavor |
| 7-7 | 80 | 20 | — | — | 3.9 | 3.8 | 4.3 |
| 7-8 | 70 | 30 | — | — | 4.2 | 4.1 | 4.4 |
| 7-9 | 60 | 40 | — | — | 4.3 | 4.4 | 4.8 |
| 7-10 | 50 | 50 | — | — | 4.7 | 4.5 | 4.7 |
| 7-11 | 0 | 100 | — | — | 4.8 | 3.9 | 4.8 |
| 7-12 | 90 | — | 10 | — | 2.6 | 3.1 | 2.8 |
| 7-13 | 90 | — | — | 10 | 2.7 | 3.1 | 2.9 |

From the above results it is clear that when flour from DMSW wheat is used, the product has fried color that was deep, and enhanced short texture and also unique flavor. However, when the content of wheat flour from DMSW wheat in total wheat flour was too increased, the product was oily with sticky texture. Therefore, the content of wheat flour from DMSW wheat appears to preferably range from 0.5 to 30 wt % in a weight of total wheat flour.

[Preparation of Whole Grain Flour]

For each of the DMSW wheat prepared above, and Norin 61 first class wheat harvested in Gunma Prefecture in 2006 (N61 wheat), whole grain flour was prepared. Wheat grains were milled using an ultracentrifugal mill ZM200 (manufactured by RETSCH Co., Ltd.) at 14,000 rpm with 0.75 mm screen to collect whole grain flour.

The above whole grain flour was used to carry out the following fermentation test.

[Fermentation Test]

The composition shown below was used to prepare dough, and fermentative ability of yeast was tested.

| | |
|---|---|
| Wheat flour | 350 g |
| Yeast | 10 g |
| Water | 200 g |

The wheat flour in the above composition was composed of Eagle™ hard flour (Nippon Flour Mills) as a commercial wheat flour, whole grain flour from DMSW wheat prepared as described above, and whole grain flour from N61 wheat, according to the compositions (weight percent) shown in a table below.

| Sample | Commercial wheat flour | N61 whole grain flour | DMSW whole grain flour |
|---|---|---|---|
| 1 | 100 | — | — |
| 2 | 99 | 1 | — |
| 3 | 80 | 20 | — |
| 4 | 99.5 | — | 0.5 |
| 5 | 99 | — | 1 |
| 6 | 95 | — | 5 |
| 7 | 80 | — | 20 |

Figure 2:
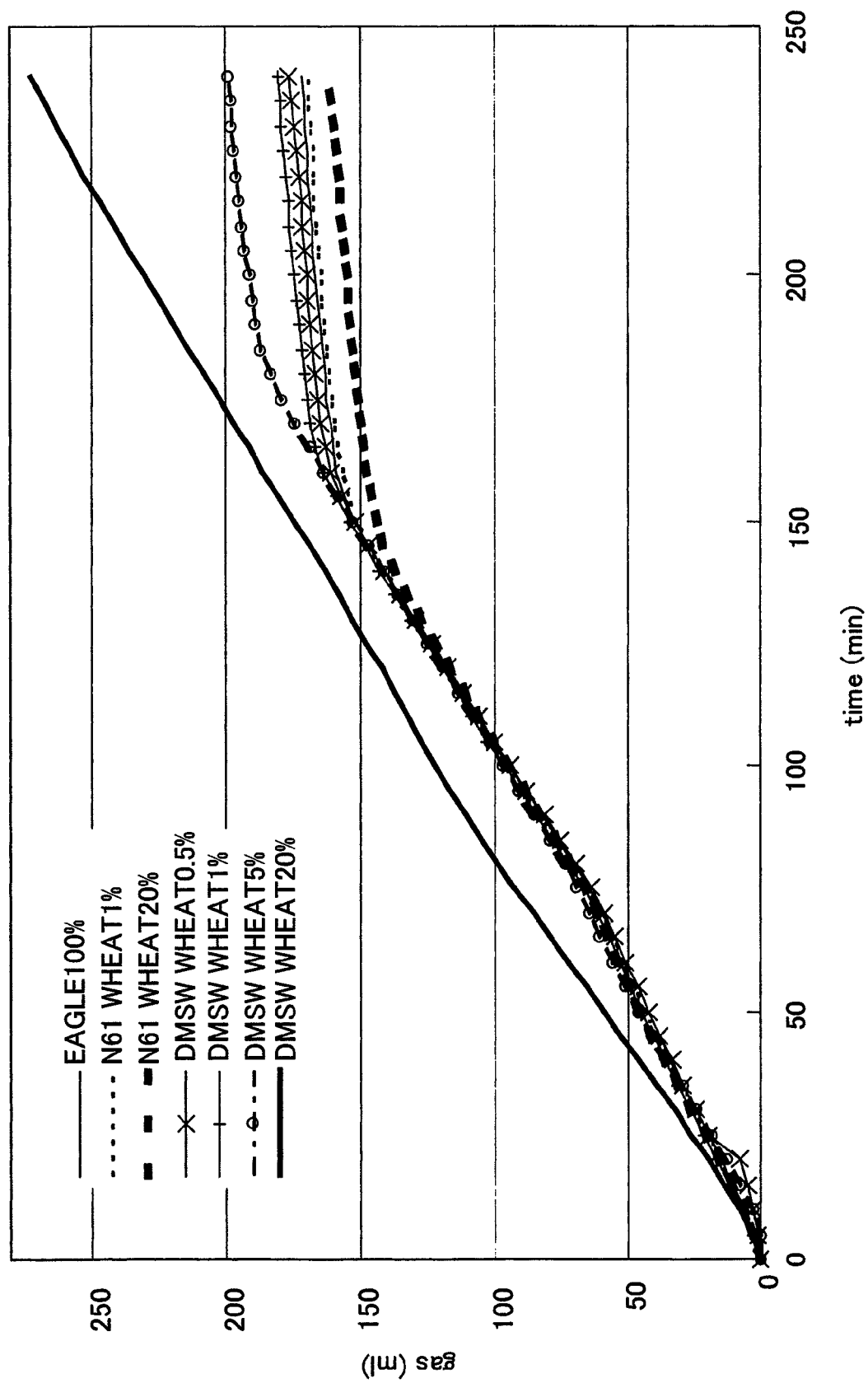
FIG. 2 shows a graph plotting over time a change of the total amount of generated gas on each of the seven samples in the fermentation test.

According to the above formulation, the materials were mixed in a mixer at low speed for 2 min and high speed for 2 min to prepare a dough (24° C.). Each dough was divided into two portions, each portion being a dough of 30 g and wadded up, and then contained in a mensurative vial to incubate at 30° C. An amount of gas generated from 5 min after starting incubation was measured in every 5 min until after 4 hours, using a farmograph (model AF-1101W manufactured by ATTO Co., Ltd.). From the obtained two data, an average was calculated and a change of the total amount of generated gas was plotted over time. A graph showing the results thus obtained from the seven samples is depicted in FIG. 2.

From these results, it was observed that the total amount of generated gas was decreased, as the content of whole grain flour from N61 wheat added to the commercial wheat flour was larger with respect to the sample of 100% of Eagle™ that is the commercial wheat flour. A main reason for this situation seems to be that the duration time of gas generation became shortened. In contrast, an elongation of duration time of gas generation was found as the content of whole grain flour from DMSW wheat added to the commercial wheat flour was larger with respect to the sample of 100% of Eagle™ that is the commercial wheat flour. That is, since DMSW wheat contains a larger amount of sugars that yeast can assimilate, it seems that yeast was under the condition of showing fermentative ability for a longer period of time. The increase of total amount of generated gas leads to effects such as dough being expanded into a larger volume. Further, a unique flavor can be added, such a unique flavor being derived from a difference of growth environment of yeast. Accordingly, a cereal flour composition containing DMSW wheat is also suitable for production of food products involving a fermentation step.

Example 8

Manufacture of Conventional White Bread

Conventional white bread was manufactured using the following recipe (parts by weight).

| | |
|---|---|
| Wheat flour | 100 |
| Sugar | 5 |
| Salt | 2 |
| Skimmed milk | 2 |
| Shortening | 5 |
| Yeast | 2 |
| Water | 68 |

The wheat flour in the above recipe was composed of commercial wheat flour (Eagle™ hard flour manufacture by Nippon Flour Mills), DMSW whole grain flour prepared as described above, and N61 whole grain flour, in the compositions (weight percent) shown in Table 12 below.

In the formulation table, the ingredients other than shortening were mixed in a mixer (SK MIXER CO., LTD., Type SK21C) for 2 min at low speed, and 3 min at medium speed 3. Average melt-in-the-mouth sensation
2. Somewhat poor melt-in-the-mouth sensation
1. Poor melt-in-the-mouth sensation, remains in the mouth

TABLE 12

| Examples | Wheat flour content in formula (wt %) | | | Evaluation parameter | | | |
|---|---|---|---|---|---|---|---|
| | Commercial wheat | DMSW whole grain flour | N61 whole grain flour | Aroma | Taste | Sweetness | Melt-in-the-mouth sensation |
| 8-1 | 100 | — | — | 3.0 | 3.0 | 3.0 | 3.0 |
| 8-2 | 99.5 | 0.5 | — | 3.1 | 3.2 | 3.3 | 3.0 |
| 8-3 | 99 | 1 | — | 3.2 | 3.2 | 3.4 | 3.2 |
| 8-4 | 98 | 2 | — | 3.2 | 3.3 | 3.7 | 3.2 |
| 8-5 | 95 | 5 | — | 3.7 | 3.6 | 3.9 | 3.3 |
| 8-6 | 90 | 10 | — | 4.0 | 3.9 | 4.2 | 3.5 |
| 8-7 | 80 | 20 | — | 4.2 | 4.1 | 4.4 | 3.6 |
| 8-8 | 70 | 30 | — | 4.3 | 4.4 | 4.7 | 3.5 |
| 8-9 | 60 | 40 | — | 4.8 | 4.5 | 4.8 | 3.3 |
| 8-10 | 90 | — | 10 | 2.7 | 2.6 | 3.0 | 2.8 |

(27° C.). After the mixer was stopped and shortening was added, mixing was performed again for 1 min at low speed, 3 min at medium speed, and 5 min at high speed, and the kneaded dough was let rise for 90 min at 27° C. and 75% humidity. After the dough was punched down, rising was continued for 30 min under the same conditions, the dough was divided into 450 g portions, rolled into balls, and let stand for a bench time of 25 min. After the dough was reshaped in a molder, it was put into a shaped pan for final proofing until the dough had enlarged to 1 cm beyond of the pan in a rising chamber at 38° C. and 85% humidity, and then baked (205° C., 25 min). The baked bread was cooled by letting it stand for 1 hour at room temperature, placed into a plastic bag, let stand until the next day at room temperature, and sliced into 25 mm thick slices to taste.

An organoleptic evaluation on 5-step scale of flavor and texture on the conventional white bread prepared in the above manner was carried out by a ten member panel based on the following parameters and evaluation criteria using an example which had Eagle™ content of 100 wt % as the flour component, as a reference standard, that is, for each parameter, example 8-1's mark was 3 in Table 12 and relative evaluation was carried out, and an average score was calculated from total score.

Aroma
5. Strong aroma
4. Rather strong aroma
3. Aroma can be normally sensed
2. Rather weak aroma
1. Weak aroma Taste
5. Extremely fragrant
4. Rather Extremely fragrant
3. Normally fragrant
2. Rather weakly fragrant
1. Weakly fragrant Sweetness
5. Extremely sweet
4. Rather extremely sweet
3. Rather sweet
2. Very slightly sweet
1. Sweetness lacking Melt-in-the-Mouth Sensation
5. Very good melt-in-the-mouth sensation
4. Good melt-in-the-mouth sensation From the above results it is found that as the content of whole grain flour from DMSW wheat is increased, unique aroma, fragrant taste and sweetness become strongly sensed. However, as the content of whole grain flour from DMSW wheat becomes highly, dough properties and melt-in-the-mouth sensation were deteriorated. Therefore, the content of whole grain flour from DMSW wheat appears to preferably range from 0.5 to 30 wt % in a weight of total wheat flour.

The invention claimed is:

1. A cereal flour composition that contains wheat flour prepared from a type of wheat that does not express the three wheat starch synthase II proteins, and also does not express the three wheat granule bound starch synthase proteins, and another type of cereal flour.

2. The cereal flour composition according to claim 1 that contains 0.5 to 30 wt % of the wheat flour prepared from a type of wheat that does not express the three wheat starch synthase II proteins, and also does not express the three wheat granule bound starch synthase proteins.

3. The cereal flour composition according to claim 1 that contains 1 to 20 wt % of the wheat flour prepared from a type of wheat that does not express the three wheat starch synthase II proteins, and also does not express the three wheat granule bound starch synthase proteins.

4. The cereal flour composition according to claim 1 that contains 2 to 20 wt % of the wheat flour prepared from a type of wheat that does not express the three wheat starch synthase II proteins, and also does not express the three wheat granule bound starch synthase proteins.

5. The cereal flour composition according to claim 1 that contains 5 to 10 wt % of the wheat flour prepared from a type of wheat that does not express the three wheat starch synthase II proteins, and also does not express the three wheat granule bound starch synthase proteins.

6. The cereal flour composition according to claim 1, wherein the other cereal flour is selected from the group consisting of wheat flour from non-waxy wheat, waxy wheat, rice flour, starch, buckwheat flour, barley flour, corn flour, and oat flour.

7. A process for producing a food product, comprising mixing auxiliary food ingredients with the cereal flour composition according to claim 1.

8. A food product manufactured by mixing auxiliary food ingredients with the cereal flour composition according to claim 1.

9. The food product according to claim 8, wherein the food product is selected from the group consisting of bakery goods, noodles, deep fried foods, foods cooked on a griddle, roux and sauces.

* * * * *